No. 720,718. PATENTED FEB. 17, 1903.
W. E. MADDOCK & W. ORME.
APPARATUS FOR PRESSING HOLLOW WARE.
APPLICATION FILED FEB. 4, 1901.
NO MODEL. 3 SHEETS—SHEET 3.
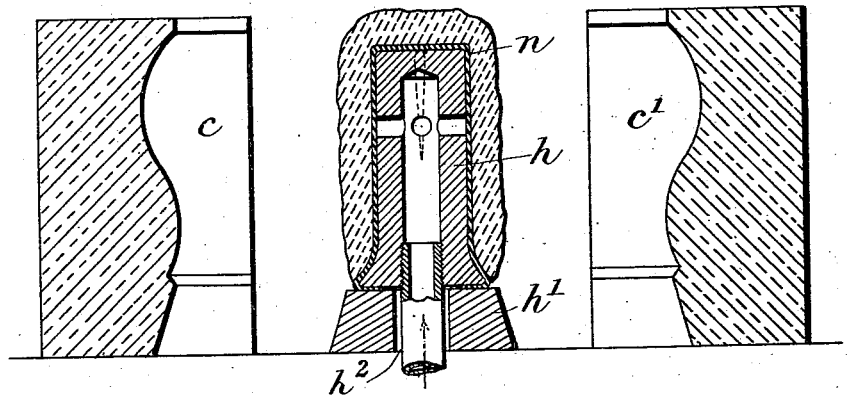
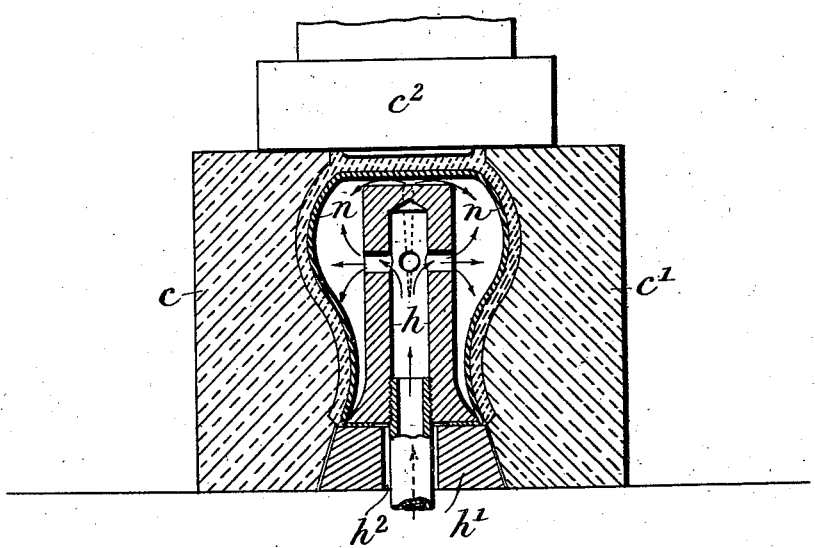

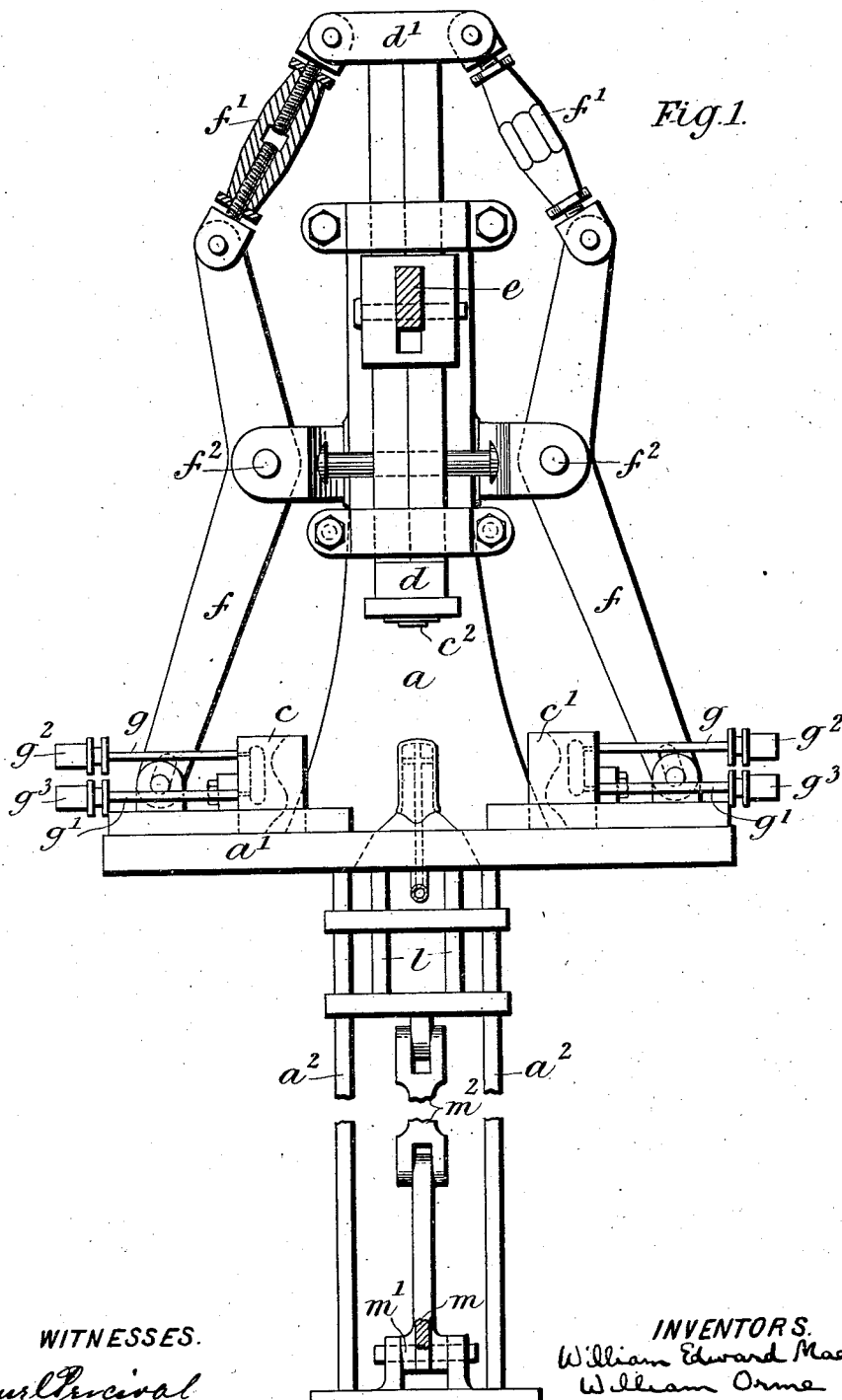

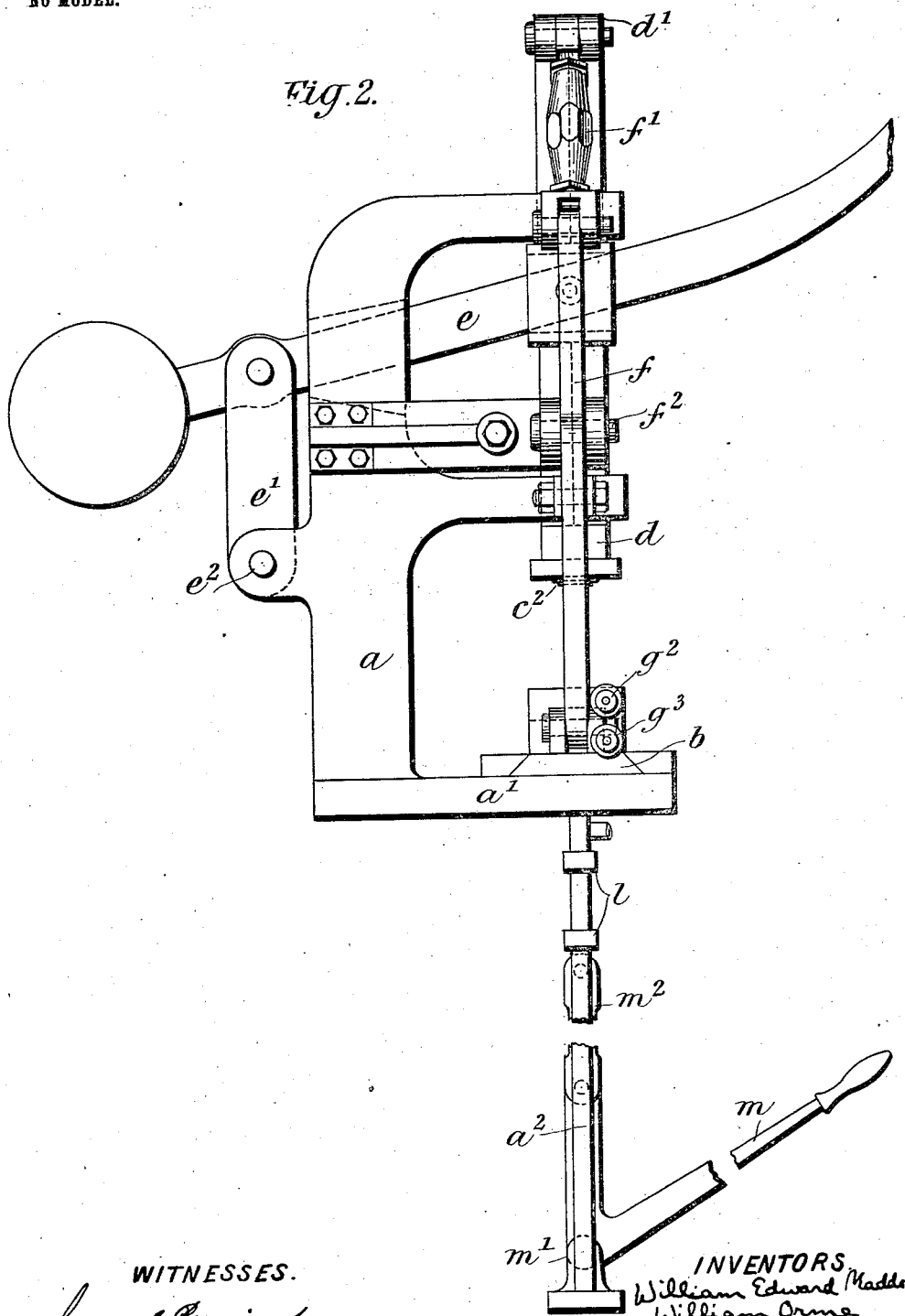

UNITED STATES PATENT OFFICE.

WILLIAM EDWARD MADDOCK, OF WOLSTANTON, AND WILLIAM ORME, OF BURSLEM, ENGLAND.

APPARATUS FOR PRESSING HOLLOW WARE.

SPECIFICATION forming part of Letters Patent No. 720,718, dated February 17, 1903.

Application filed February 4, 1901. Serial No. 45,995. (No model.)

*To all whom it may concern:*

Be it known that we, WILLIAM EDWARD MADDOCK, residing at Dimsdale View, Porthill, Wolstanton, and WILLIAM ORME, residing at 59 Liverpool road, Burslem, in the county of Stafford, England, have invented certain new and useful Improvements in Apparatus for Pressing Hollow Ware, (for which we have made application for patent in Great Britain, No. 12,937, on the 18th of July, 1900;) and we do hereby declare the following to be a full, clear, and exact description of the invention, such as will enable others skilled in the art to which it appertains to make and use the same.

This invention for improvements in apparatus for pressing hollow ware has for its object to substitute machine-work for the usual handwork in the process of molding hollow ware—such as jugs, cups, vegetable-dishes, vases, flower-pots, mugs, and the like, both in earthenware, china, or marl and the like—made from plastic clays.

The invention consists in placing a sheet of clay or the like over the core or chum, inserting the core or chum, with the clay, into the mold corresponding to the outer surface of the article to be molded, expanding the core or chum corresponding to the inner surface of the article and so forcing the clay to take the impression and shape of both the outer mold and inner mold, collapsing the expanded core or chum, withdrawing the core or chum from the article, reinserting the collapsed core or chum, and opening out the mold, when the finished article will be left loose on the collapsed core or chum.

In one way of carrying out this invention the parts of the mold are fixed on slides, so that they can be brought together or separated.

The core or chum consists of an elastic cover supported on a solid shape provided with means for introducing fluid-pressure into the elastic cover.

In the accompanying three sheets of illustrative drawings, Figures 1 and 2 are side elevations, at right angles to one another, of an apparatus for molding hollow ware. Fig. 3 is a section of the mold and core or chum, showing the parts in the position they occupy just before the mold is closed; and Fig. 4 is a similar view showing the parts in the position they occupy just after the core or chum is expanded to force the clay into the mold.

As shown, the mold is made in three parts—the two sides $c$ $c'$ and the bottom $c^2$. The machine-frame $a$, provided with the table $a'$, carries the slides $b$, to which are attached the two sides $c$ $c'$. The plunger $d$, sliding vertically in the frame $a$, carries the bottom $c^2$ of the mold. The plunger $d$ is operated by a counterweighted lever $e$, fulcrumed to a link $e'$, pivoted to the frame $a$ at $e^2$. The upper end of the plunger $d$ has fixed on it a crosshead $d'$, that is connected by the adjustable side links $f'$ to the levers $f$, fulcrumed to the frame $a$ at $f^2$ and connected to the slides $b$ by means of a pin-and-slot connection. By this mechanism when the lever $e$ is pulled down the sides $c$ $c'$ close in together, and the bottom $c^2$ descends onto the sides to form a complete mold, the parts moving simultaneously. The adjustable side links $f'$ enable the parts to be adjusted so that as the two sides come together the bottom comes onto them.

The two sides $c$ $c'$ of the mold are hollow and are connected to inlet and outlet pipes $g$ $g'$, fitted with sliding joints $g^2$ $g^3$ to allow of the movements of the sides. Steam or other heating agent can be admitted through the pipes to heat the mold.

The core or chum $h$ fits onto the block $h'$, that is fixed to the frame $l$, sliding vertically below the table on the side bars $a^2$ of the frame $a$, so that the core or chum can be raised vertically into the mold or lowered out of it. The frame $l$ is operated by the hand-lever $m$, fulcrumed at $m'$ and connected by the link $m^2$ to the frame $l$. The block $h'$ is provided with a passage $h^2$ for admitting fluid, and this passage communicates with a similar passage extending to the top of the core or chum $h$.

The core or chum consists of the foot or lower part, that fits in and closes the top of the mold, (the mold being inverted the top is now at the bottom,) and of the upper part, on which is fitted the elastic cover or envelop $n$, that is secured around the foot or lower part of the core or chum. Preferably the elastic cover consists of vulcanized india-rubber molded approximately to the shape of the internal surface of the article to be molded.

The operation of the apparatus is as follows: The collapsed core or chum $h$ being raised above the table $a'$, a layer of clay is placed over it. The lever $e$ is then operated to bring the mold $c$ $c'$ $c^2$ around the core or chum, so that the parts fit closely together. If the clay is plastic, the mold is continuously heated by steam or other heating agent admitted through the pipes $g$ $g$ and exhausted through pipes $g'$ $g'$. If the clay is in a semidried condition, it is placed over the core or chum in a rough form and approximately similar in shape. In this case the mold would not require heating on account of the rough form having already been dried to a consistency to allow of being handled when it came from the mold. Fluid-pressure is then admitted through the passage $h^2$ to expand the core or chum cover $n$ and force the clay evenly into the mold. The cover $n$ is then collapsed by relieving the pressure and, if necessary, applying a vacuum, and withdrawn (to allow the steam or vapor to escape out of the inside of the article) by operating the lever $m$ and is again reinserted. The lever $e$ is now raised to separate the parts $c$ $c'$ $c^2$ of the mold, and the molded article is left loosely on the chum.

What we claim, and desire to secure by Letters Patent, is—

1. In a molding-machine, a mold corresponding in shape to the outer surface of the article to be molded, a core or chum adapted to support a sheet of clay or a rough semidried form comprising an internal support, an elastic cover situated over the top of the same and secured thereto at its lower edge, a means for inserting the core or chum upward with the clay into the mold, a means for admitting fluid-pressure between the support and the cover to expand the cover and force the clay to take the impression and shape of the mold.

2. A core or chum for molding hollow ware consisting of a support, an elastic cover situated over the top and sides of the support and having its bottom edge secured to the support, and a means for admitting fluid-pressure between the support and the cover.

3. The apparatus for molding hollow ware consisting of slides carrying the parts of the mold, a means for operating the slides so that they can be brought together to form the mold or be separated to open out the mold, a core or chum adapted to support a sheet of plastic clay, a means for inserting the core or chum with the clay upward into the mold, and a means for expanding or contracting the core or chum.

4. The apparatus for molding hollow ware consisting of slides carrying the parts of the mold, a means for operating the slides so that they can be brought together to form the mold or be separated to open out the mold, a slide carrying the core or chum, a means for operating the core or chum so that it can be inserted with the clay into the mold or withdrawn therefrom and a means for expanding or contracting the core or chum.

In testimony whereof we have affixed our signatures in presence of two witnesses.

WILLIAM EDWARD MADDOCK.
    WILLIAM ORME.

Witnesses:
    A. V. BROOKE,
    JOHN H. COPESTAKE.